United States Patent [19]
Roper et al.

[11] Patent Number: 5,592,524
[45] Date of Patent: Jan. 7, 1997

[54] UNIVERSAL ELECTRICAL INTERFACE FOR DIGITAL SPOTFILM PRODUCT

[75] Inventors: Frank H. Roper, Richmond Heights; Joseph J. Ferencie, Solon, both of Ohio

[73] Assignee: Picker International, Inc., Highland Heights, Ohio

[21] Appl. No.: 533,454

[22] Filed: Sep. 25, 1995

[51] Int. Cl.$^6$ ................................................. H05G 1/58
[52] U.S. Cl. ................................... 378/98.2; 378/116
[58] Field of Search ........................ 378/98.2, 98, 101, 378/114, 115, 116

[56] References Cited

U.S. PATENT DOCUMENTS

| | | | |
|---|---|---|---|
| 4,533,947 | 8/1985 | Smith | 378/98.2 |
| 4,719,644 | 1/1988 | Herzog et al. | 378/98.2 |
| 4,760,447 | 7/1988 | Koka et al. | 358/139 |
| 5,177,775 | 1/1993 | Onodera et al. | 378/98.2 |
| 5,226,066 | 7/1993 | Barr | 378/98.2 |
| 5,473,659 | 12/1995 | Haewndle et al. | 378/98.2 |

*Primary Examiner*—David P. Porta
*Attorney, Agent, or Firm*—Fay, Sharpe, Beall, Fagan, Minnich & McKee

[57] ABSTRACT

A medical diagnostic imaging system includes a system controller (16) which generates first logic format control signals. The first logic format control signals operate an x-ray source and are designed to operate a large format camera through a plurality of data paths. The large format camera is disconnected from the diagnostic imaging system and replaced with digital camera (32) and a digital imaging processor (34) which are incompatible with the diagnostic imaging system. A universal interface (36) is selectively connected to the data paths of the diagnostic imaging system and to the digital imaging processor (34). The universal interface (36) intercepts the first control signals from the system controller (16), and generates second control signals based on the first control signals which operate the digital imaging processor (34) and digital camera (32) transparent to the operations of the system controller (16).

10 Claims, 3 Drawing Sheets

1

UNIVERSAL ELECTRICAL INTERFACE FOR DIGITAL SPOTFILM PRODUCT

BACKGROUND OF THE INVENTION

The present invention relates to the art of diagnostic imaging. It finds particular application in conjunction with nuclear or gamma cameras and will be described with particular reference thereto. The present invention will also find application in other imaging systems such as x-ray computed tomography, fluoroscopy, and angiography systems.

Photographic cameras and video monitors are commonly interconnected with medical diagnostic imaging equipment. The cameras include an internal video display for converting electronic image signals into a suitable display or exposing photographic film. Most commonly, black and white positive film is utilized such that the images are recorded directly on the photographic film for display on a conventional light box. The camera was typically a large format camera using 100 mm or 105 mm film to record images generated during a scan.

One form of the diagnostic imaging equipment includes an x-ray source, x-ray detector, large format camera, and a controller. The controller generates and exchanges signals between the components to perform operations. The signals are generated having predetermined logic or voltage levels specific to the type of diagnostic imaging equipment.

One disadvantage is that diagnostic imaging systems using a large format camera generate a large quantity of film which, in turn, requires a large storage area. Another disadvantage is that each diagnostic imaging system is specifically configured for a particular large format camera. Replacing the large format camera involves painstaking modifications to the physical structure of the x-ray system and the new camera being installed so that the two components are compatible. Another disadvantage is that the silver halide films are expensive. The expense is only partially recovered by reprocessing discarded film to recover the silver.

The present invention provides a new and unique interface device which overcomes the above-referenced problems and others.

SUMMARY OF THE INVENTION

In accordance with the present invention, a method and apparatus are provided for interfacing a diagnostic imaging system which communicates with an original image recorder with an incompatible digital imaging device.

In accordance with one embodiment of the present invention, the diagnostic imaging system includes an x-ray source, an x-ray detector assembly, an image recorder, and a controller which generates control signals having a first logic level and exchanges the control signals between the components over a plurality of data channels. An interface circuit includes a plurality of dual function devices. Each of the dual function devices has an input selectively connected to one of the data channels for intercepting the control signals. Each of the dual function devices further has an output selectively connected to an output port of the interface circuit which is electrically connected to the digital imaging device. The dual function devices generate a plurality of second control signals based on the first control signals intercepted. The second control signals have a second logic level different from the first logic level and operate the digital imaging device. The dual function devices furthermore electrically isolate the digital imaging device and the diagnostic imaging system from each other.

In accordance with a more limited aspect of the present invention, the dual function devices are optical isolators which include a light emitting diode connected to receive the first control signals from the diagnostic imaging system and produce light in response to receiving each of the first control signals. The optical isolator further includes a phototransistor optically coupled to the light emitting diode. The phototransistor detects the light produced by the light emitting diode and generates a second control signal which is recognized by and operates the digital imaging device.

In accordance with another aspect of the present invention, a method for converting a diagnostic imaging system which is configured to communicate with a first camera system to communicate with an incompatible second camera system is provided. The first camera system is disconnected from the diagnostic imaging system. A control signal interface has a plurality of input and output data channels which are selectively connected to the diagnostic imaging system and the second camera system. Operational control signals which are generated by the diagnostic imaging system to operate the first camera system are converted into operational control signals which are compatible to the second camera system and control the second camera system.

One advantage of the present invention is that it enables any type of diagnostic imaging system to be interfaced with a new camera imaging device. In this manner, large format film cameras are removed and the diagnostic system is easily upgraded with a digital imaging device.

Another advantage of the present invention is that by replacing the large format camera, large storage areas required to store the film generated by the large format camera and silver recovery processing operations are eliminated.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
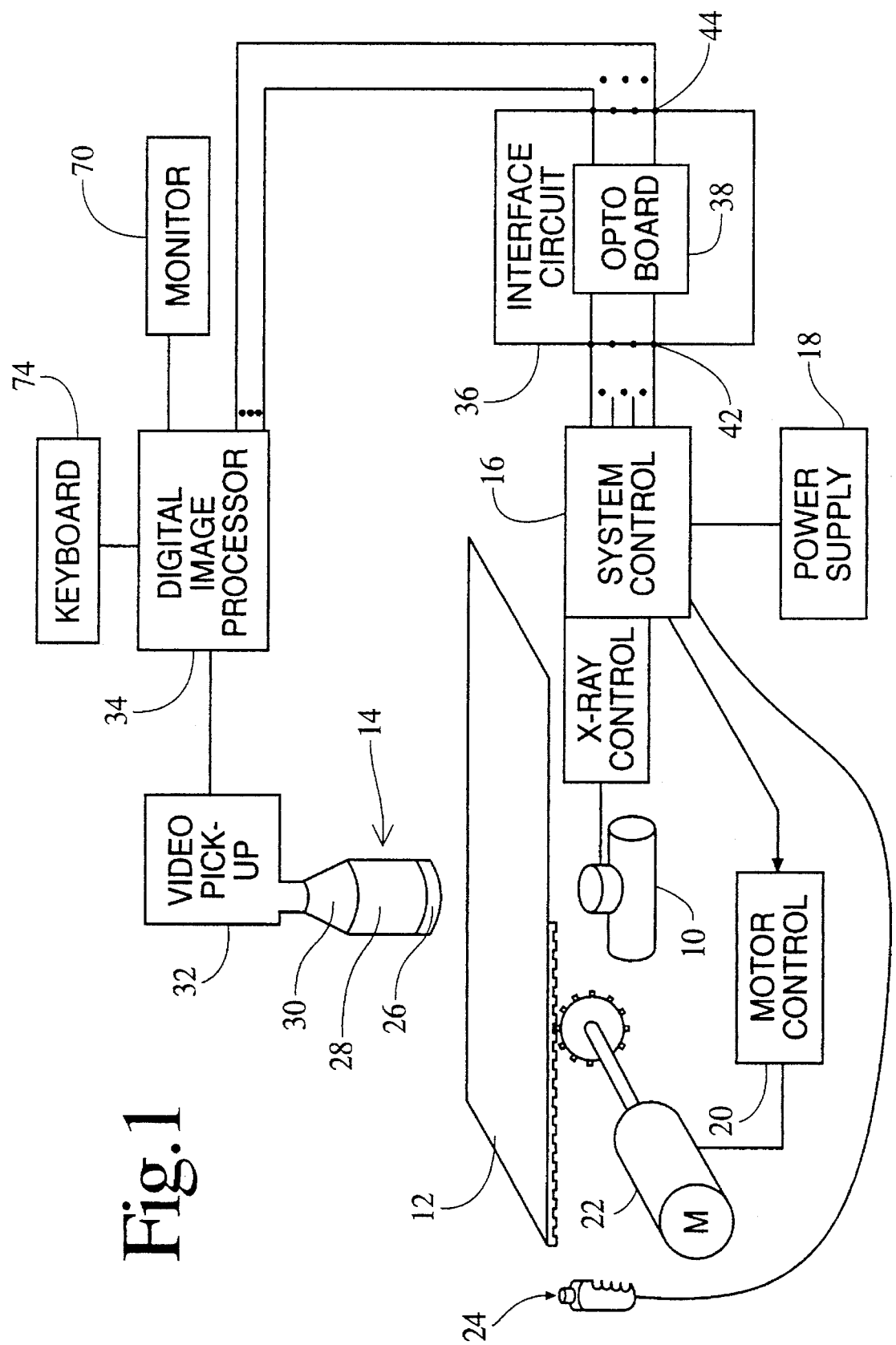
FIG. 1 is an illustration of a diagnostic imaging system interfaced with an installed digital image processor according to the present invention.

With reference to FIG. 1, a radiation source 10, such as an x-ray tube, selectively passes a beam of radiation through a subject supported on a couch or support 12 to an x-ray detector assembly 14. A system controller 16 electronically controls the x-ray tube to stop and start the generation of x-rays, controls the exposure level and duration, and controls currents and voltages generated from a power supply 18 by exchanging control signals between the system components. The control signals have predetermined logic and voltage levels which are recognized by the system components. High-true logic or low-true logic is commonly used as is known in the art. A motor control 20 activates a motor 22 which selectively slides the support 12. An operator held remote control 24 can also activate the movement of the couch The radiation detector assembly 14 includes a phosphor plate or sheet 26 disposed behind an optically opaque but radiation transparent shield. The phosphor converts received radiation into a relatively faint optical image. Preferably, the phosphor is part of an image intensifier 28 that boosts the intensity of the optical image. A lens system 30 focuses the intensified optical image.

Initially, an out-of-date medical diagnostic system has a large format camera that records images on photographic film, a relatively primitive video camera, or the like. The camera, the x-ray tube and associated system control circuit 16 communicate via a logic format that varies with the age of the system and the manufacturer. The out-of-date camera and its control system are removed and replaced with a new video camera 32 and a new control system 34, such as a digital spot camera system from Picker International. Typically, the logic signal formats, such as the voltage levels of logical high or "1" and low or "0" signals, of the new camera and control system, do not match the logic format of the x-ray tube and system controller 16 and other remaining portions of the old system. A universal interface 36 interfaces between the two logic formats.

Figure 2:
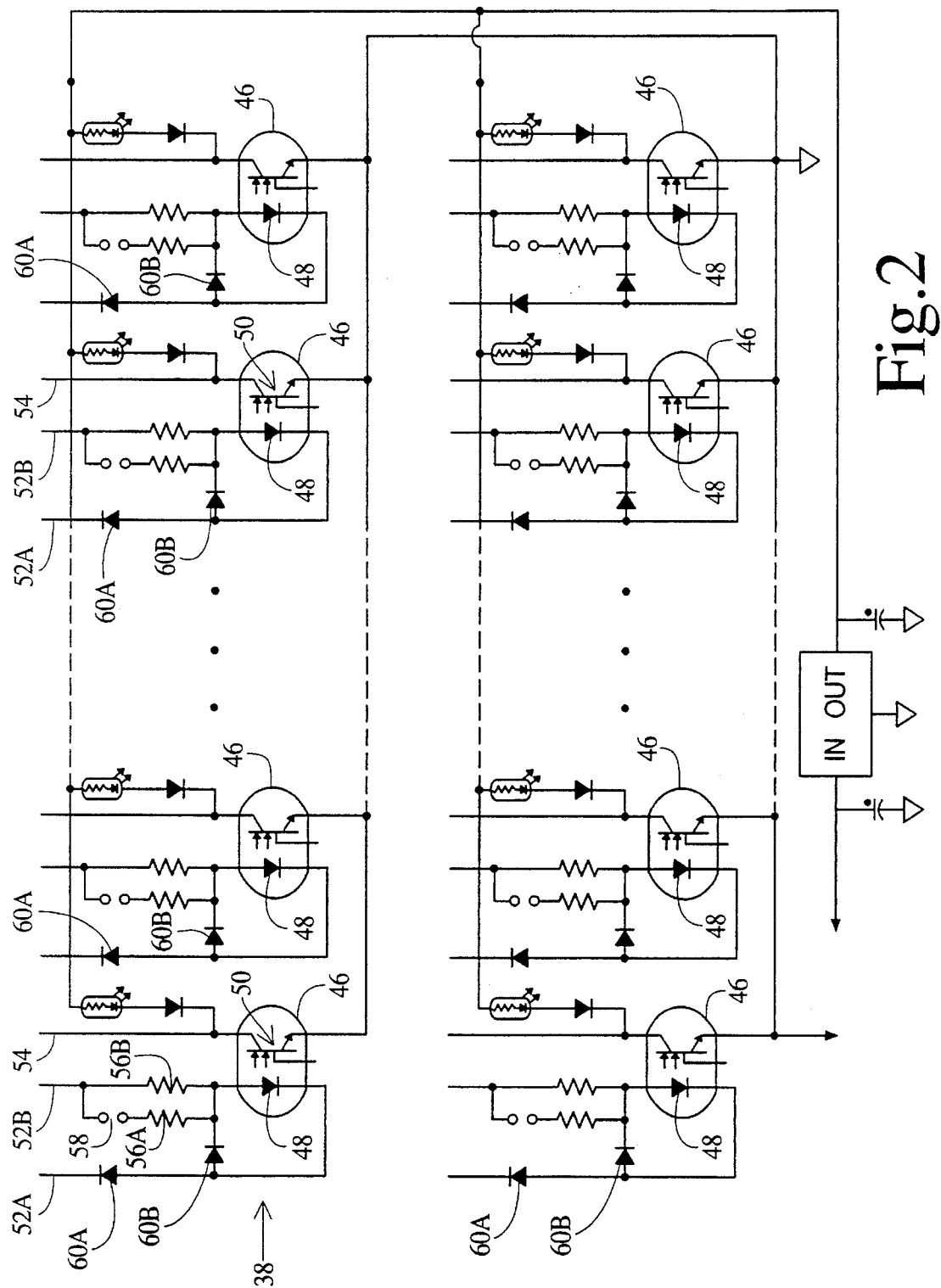
FIG. 2 is a schematic diagram of an optical isolator circuit of the interface in accordance with the present invention; and, FIG. 3 is a block diagram showing connections between the digital image processor and interface according to the present invention.
Figure 3:
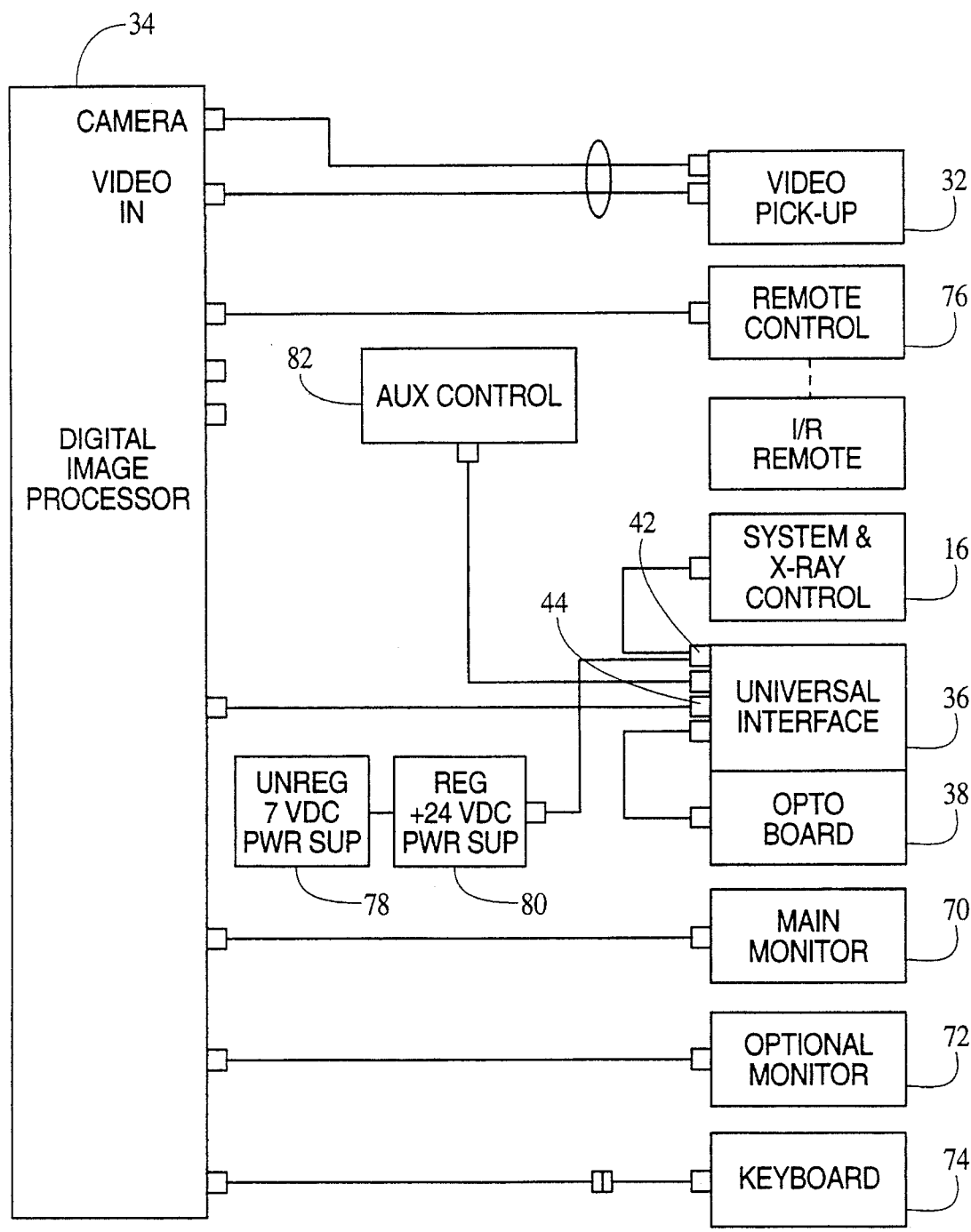

With continuing reference to FIG. 1 and further reference to FIGS. 2 and 3, the universal interface includes an optical isolator 38 and a plurality of first 36 data ports 42 and a plurality of second data ports 44. The plurality of first data ports are selectively connected to data paths which provide communication with the system controller 16. The connections are made in accordance with the type of signal transmitted on a particular data path and the type of logic level of the signal. The data paths carry logic signals that coordinate operation of the camera device and the x-ray tube. For example, the signal types include actual length of exposure, rotor start, exposure release, foot switch controls, under table radiographic acquisition/fluoroscopy settings, and other settings.

With particular reference to FIG. 2, the interface circuit 36 includes a plurality of opto-isolators 46. Each opto-isolator 46 includes a light emitting diode 48 and a phototransistor 50 which is optically coupled to the light emitting diode 48. Input signals to each opto-isolator 46 are carried on input line 52a connected to the cathode of the light emitting diode 48 and input line 52b connected to the anode of the light emitting diode 48. The input lines 52a and 52b are connected to one of the data paths 34 through one of the data ports 42, depending on the voltage level of the signal used by the controller 16. If a signal is in high-true logic form, ranging from −27 volts to 0 volts, the cathode input 52a is connected to the data path of that signal, and the anode input 52b is connected to 0 volts. If the signal ranges from +24 volts to 0 volts, the anode input 52b is connected to the data path while the cathode input 52a is connected to 0 volts.

When a signal is received by the light emitting diode 48, it produces light which is detected by the optically coupled phototransistor 50. The phototransistor 50 generates a corresponding signal on an output line 54. The generated signal has a voltage or logic level compatible with the digital image processor 34, such as low-true logic. The output line 54 of each opto-isolator 46 is connected to one of the second data ports 44 depending on the inputted signal type coming from the controller 16, such as an actual length of exposure signal. The output line 54 of that opto-isolator is connected to the actual length of exposure signal path to the digital image processor 34 through a corresponding second data port 44. In the phototransistor 50, the collector is connected to the output line 54 and the emitter is connected to 0 volts or DC return to generate a signal having a low-true logic form.

With further reference to FIG. 2, in another embodiment where the controller 16 generates signals having logic levels between 12 and 15 volts, resistors 56a and 56b are connected to the anode input line 52b. If 12 to 15 volt signals are being converted, a jumper 58 is connected. When the jumper 58 is connected, the resistors 56a and 56b are in parallel and adjust the voltage of the incoming signal to an appropriate level. Optionally, isolation diodes 60A and 60B are connected to the opto-isolator 46 to prevent feedback and protect against transient noise and voltage.

The number of first data ports 42, second data ports 44, and opto-isolators 46 is such that it accommodates a variety of diagnostic imaging systems. In the preferred embodiment, there are about 10 of each.

The universal interface 36 intercepts the camera signals transmitted by the system controller 16 which are intended to control the original camera device. Based on the intercepted camera signals, the optical isolator circuit 38 generates new control signals which are compatible with the new camera system. Furthermore, since there is no electrical connection between the controller 16 and the image processor 34, the optical isolator circuit 38 electrically isolates the diagnostic imaging system from the new camera system.

With the universal interface, any type of diagnostic imaging system is easily adapted to operate a new camera system. The diagnostic imaging system operates as though it is still controlling the original camera system. Signals transmitted to the new camera system from the diagnostic imaging system are used to generate new signals which are compatible with the new camera system.

With particular reference to FIG. 3, interconnections between components of the new camera system and the interface circuit 36 are shown. The components can be disposed in a common cabinet which includes the digital image processor 34, a main monitor 70, and one or more optional monitors 72, operator commands are inputted through a keyboard 74 to display images from the image processor 34 onto the main monitor 70. The image processor 34 and video pick-up 32 is connected via an infrared, wireless remote control 76 as is known in the art.

The interface circuit 36 includes a 7 volt DC source 78 to power an LED display (not shown) which shows system status, and a 24 volt DC source 80 which powers the video pick-up 32. An auxiliary control 82 allows an operator to select digital spot, frame rates, or other camera settings.

The universal interface circuit 36 allows a diagnostic imaging system having a photographic camera to be upgraded to a digital imaging system. Once installed, the universal interface 36 converts signal formats between the new imaging system and the original diagnostic system, providing uninterrupted and transparent operations therebetween.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In a diagnostic imaging system which generates a plurality of first control signals for controlling an x-ray source and a formerly connected first imaging device, the improvement comprising:

a substitute second imaging device mounted in place of the former first imaging device for generating images from x-rays that have passed from the x-ray source through a subject;

an interface circuit including a plurality of dual function devices, each of the plurality of dual function devices having an input selectively connected to one of the plurality of data channels for intercepting the plurality of first control signals and each of the plurality of dual function devices having an output selectively connected to the second imaging device, the plurality of dual function devices (i) generating a plurality of second control signals based on the plurality of first control signals intercepted for operating the second imaging device, and (ii) electrically isolating the second imaging device and the diagnostic imaging system from each other.

2. The system as set forth in claim 1, the improvement further comprising:

the dual function devices each including a light emitting diode electrically connected to the input, and a phototransistor optically connected to the light emitting diode and electrically connected to the output, the light emitting diode producing light in response to receiving one of the plurality of first control signals and the phototransistor detecting the light produced and generating a corresponding second control signal.

3. The apparatus as set forth in claim 1 further characterized by the second imaging device being a digital imaging device which generates digital signals representative of an image.

4. A method for interfacing a diagnostic imaging system which communicates with a first camera device to communicate with an incompatible second camera device, the diagnostic imaging system including an x-ray source for transmitting radiation through a subject, an x-ray image generator for generating x-ray images indicative of the transmitted radiation, an image converter for converting the x-ray images to optical images, and a first camera device for recording the optical images, the diagnostic imaging system generating a plurality of first operational control signals being communicated over a plurality of control data channels for operating and synchronizing the x-ray source and the first camera device, the method comprising:

disconnecting the first camera device from the diagnostic imaging system;

providing a control signal interface having a plurality of input and output data channels;

selectively connecting the plurality of input data channels of the control signal interface to the plurality of control data channels which communicate between the diagnostic imaging device and the first camera device;

connecting the second camera device to the plurality of output data channels of the control signal interface; and, converting, by the control signal interface, the plurality of first operational control signals generated by the diagnostic imaging system which operate the first camera device into a plurality of second operational control signals for controlling the second camera device.

5. The method as set forth in claim 4 wherein the selectively connecting includes wiring the plurality of input data channels to the plurality of control data channels in a predetermined arrangement.

6. The method as set forth in claim 4 further including converting the plurality of second operational control signals transmitted from the second camera device into the plurality of first operational control signals which are compatible with the diagnostic imaging system.

7. An apparatus for interfacing a diagnostic imaging system designed for a first imaging device that is controlled with first format logic signals of a first logic circuit with a second imaging device that is controlled by second format logic signals of a second logic format, the diagnostic imaging system transmitting and receiving the first format logic signals for communicating imaging information over a plurality of data paths, the first format logic signals being inconsistent with the second format logic signals, the apparatus comprising:

an interface circuit having a plurality of first data ports and a plurality of second data ports, the plurality of first data ports being selectively connected to the plurality of data paths of the diagnostic imaging system to receive the first format logic signals, the plurality of second data ports being selectively connected to the second imaging device; and a signal converter connected between the plurality of first and second data ports of the interface circuit for receiving the first format logic signals transmitted from the diagnostic imaging system, and converting each received first format logic signal to the second format to generate a corresponding second format logic signal which is conveyed to the second data ports for operating the second imaging device.

8. The apparatus as set forth in claim 7 wherein the signal converter includes a plurality of optical isolators having inputs connected to the plurality of first data ports and having outputs connected to the plurality of second data ports.

9. The apparatus as set forth in claim 8 wherein each optical isolator includes a light emitting diode for converting a received first format logic signal into light and a phototransistor for detecting the light and converting the light into the corresponding format logic signal.

10. The apparatus as set forth in claim 7, wherein the second imaging device includes a digital video pick-up and a digital image processor electrically connected to the interface circuit.

* * * * *